United States Patent
Bechtold et al.

(12)

(10) Patent No.: US 6,767,448 B1
(45) Date of Patent: Jul. 27, 2004

(54) METHOD FOR PRODUCING AQUEOUS ALKALINE SOLUTIONS OR REDUCED INDIGOID DYES

(75) Inventors: Thomas Bechtold, Dornbirn (AU); Rudolf Krüger, Weisenheim (DE); Hans-Peter Maier, Stuttgart (DE); Georg Schnitzer, Nürnberg (DE); Franz Sütsch, Rödersheim-Gronau (DE); Wolfgang Schrott, Böhl-Iggelheim (DE); Norbert Grund, Ludwigshafen (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/049,728

(22) PCT Filed: Apr. 17, 2000

(86) PCT No.: PCT/EP00/03468

§ 371 (c)(1),
(2), (4) Date: Oct. 25, 2001

(87) PCT Pub. No.: WO00/66663

PCT Pub. Date: Nov. 9, 2000

(30) Foreign Application Priority Data

Apr. 29, 1999 (DE) .......................................... 199 19 746

(51) Int. Cl.[7] .................................................. C25B 3/04
(52) U.S. Cl. ....................................... 205/687; 205/688
(58) Field of Search .................................. 205/688, 687

(56) References Cited

U.S. PATENT DOCUMENTS 5,244,549 A * 9/1993 Bechtold
5,586,992 A 12/1996 Schnitzer et al. .............. 8/653

FOREIGN PATENT DOCUMENTS

| DE | 4320867 | 1/1995 |
|----|---------|--------|
| DE | 19831291 | 1/2000 |
| FR | 769353 | 8/1934 |
| WO | 90/15182 | 12/1990 |
| WO | 94/23114 | 10/1994 |
| WO | 95/07374 | 3/1995 |
| WO | 96/32445 | 10/1996 |

* cited by examiner

*Primary Examiner*—Arun S. Phasge
(74) *Attorney, Agent, or Firm*—Connolly Bove Lodge & Hutz LLP

(57) ABSTRACT

From 5 to 60% by weight aqueous alkaline solutions of reduced indigoid dyes are prepared by reducing the indigoid dye electrochemically in the presence of a mediator.

11 Claims, No Drawings

METHOD FOR PRODUCING AQUEOUS ALKALINE SOLUTIONS OR REDUCED INDIGOID DYES

DESCRIPTION

The present invention relates to a process for preparing from 5 to 60% strength by weight aqueous alkaline solutions of reduced indigoid dyes.

Indigoid dyes, especially indigo itself and its bromine derivatives such as Brilliant Indigo, are well known vat dyes, which are used for dyeing cellulosic textile material. Indigo is particularly important for dyeing cotton warp yarns for blue denim articles.

For dyeing, the water-insoluble dye first has to be reduced (vatted) to convert it into the water-soluble leuco form which has affinity for fiber and which, after going onto the material to be dyed, is then oxidized back to the water-insoluble vat dye pigment.

In conventional indigo dyeing processes, the indigo is reduced in a vessel upstream of the dyebath in an alkaline medium by using sodium dithionite (hydrosulfite) as reducing agent. This method usually produces 8% strength by weight leuco indigo solutions, and the dyehouse wastewater contains large amounts of sulfate and sulfite.

To avoid these disadvantages, a dyeing process was developed to utilize leuco indigo produced by catalytic hydrogenation (WO-A94/23114). As described in prior German Patent Application 198 31 291.1, catalytic hydrogenation in conjunction with certain process measures can be used to produce leuco indigo solutions having a leuco indigo content of up to 55% by weight.

WO-A-90/15182, 95/07374 and 96/32445 disclose the electrochemical reduction of indigo in the presence of large amounts of a mediator (around 4.5% by weight of iron, based on the indigo quantity) in very dilute solution (up to 0.5% strength by weight).

It is an object of the present invention to provide more concentrated indigoid dye solutions which are advantageously useful for dyeing.

We have found that this object is achieved by a process for preparing a from 5 to 60% by weight aqueous alkaline solution of a reduced indigoid dye, which comprises reducing said indigoid dye electrochemically in the presence of a mediator.

The mediator can be any redox system known for electrochemical dye reduction.

Examples are mediators based on quinonoid compounds such as anthraquinonesulfonic acids and hydroxyanthraquinones, e.g., 1,2-dihydroxy-9,10-antraquinone, and on quinoneimines and diimines and also mediators based on transition metal complex salts.

Among transition metal complex salts, iron(II/III) complex salts are particularly important.

Examples of particularly suitable complexing agents are triethanolamine, triisopropanolamine and bicine and the aliphatic hydroxy compounds described in DE-A-43 20 867, which contain at least two coordination-capable hydroxyl groups and may additionally contain up to two aldehyde, keto and/or carboxyl groups, in which connection compounds derived from sugars are of particular interest. Specifically, the following examples are preferred:

di- and polyalcohols such as ethylene glycol, diethylene glycol, pentaerythritol, 2,5-dihydroxy-1,4-dioxane, especially sugar alcohols such as glycerol, erythritol, hexitols such as mannitol, dulcitol, sorbitol and galactitol;

di- and polyhydroxyaldehydes such as glyceraldehyde, triose reductone, especially sugars (aldoses) such as mannose, galactose and glucose;

di- and polyhydroxyketones such as, in particular, sugars (ketoses) such as fructose;

di- and polysaccharides such as sucrose, maltose, lactose, cellulose and molasses;

di- and polyhydroxymonocarboxylic acids such as glyceric acid, particularly acids derived from sugars, such as gluconic acid, heptagluconic acid, galactonic acid and ascorbic acid;

di- and polyhydroxydicarboxylic acids such as malic acid, particularly sugar acids such as glucaric acids, mannaric acids and galactaric acid;

trihydroxycarboxylic acid such as citric acid.

It will be appreciated that mixtures of complexing agents can also be used.

Particular preference is given to monocarboxylic acids derived from sugars (especially gluconic acid and particularly heptagluconic acid) and their esters, lactones and salts.

The molar ratio between complexing agent and iron cation is customarily in the range from 15:1 to 5:1 in the case of iron(II/III)/triethanolamine complexes and generally in the range from 3:1 to 0.5:1, especially in the range from 1.5:1 to 0.5:1, in the case of complexes with the complexing agents described in DE-A-43 20 867, especially heptagluconic acid.

Iron(II/III) complex salts can be prepared by mixing iron(II) or (III) salts such as iron sulfate, iron acetate or preferably iron chloride with the complexing agent or one of its salts in the presence of water. The starting compounds can be used in the form of a solid or in the form of an aqueous solution. If an iron(III) salt is used, the iron(III) is preferably reduced to the active iron(II) complex at the start of the electrolysis.

The mediator is preferably used in the process of the invention in the form of an alkaline solution from about 5 to 8% strength by weight.

Surprisingly, the process of the invention needs a significantly smaller amount of mediator to reduce the indigoid dye than the above-described processes for electrochemical dye reduction. For instance, the amount used in the case of a mediator which transfers one electron per molecule is customarily in the range from 0.003 to 0.08 mol, preferably in the range from 0.008 to 0.05 mol, of mediator per mole of dye.

This small amount of mediator has little if any effect on the solubility of the reduced dye. Therefore, the mediator does not have to be removed from the ready-prepared leuco dye solution.

Advantageously, in the process of the invention, only a portion of the total amount of dye to be reduced is precharged to the electrolysis cell and the remainder is added a little at a time (in power or paste form) during the reduction. However, the addition of dye need not be commenced until after the current has been switched on. This makes it possible to produce even highly concentrated leuco dye solutions (especially >20% strength by weight leuco indigo solutions) without problems, which is not possible with reducing agents such as hydrosulfite or by hydrogenation.

It is particularly advantageous for viscosity reasons for the concentration of unvatted dye in the electrolysis bath not to exceed 25% by weight, especially 20% by weight.

If cathodes of carbon or graphite felt are used (and they permit a particularly high current yield), it is advisable to further lower the solids content of the electrolysis bath (and keep it as low as possible) so as to prevent blinding of or mechanical damage to the electrode material.

The reduced dye is soluble in an aqueous alkaline medium in the form of a leuco salt. Up to 20% by weight leuco indigo solutions are stable in the presence of one alkali metal hydroxide as alkali. At up to 80° C. this is true for up to 40% by weight solutions.

To keep the reduced dye in stable solution at relatively high concentration (generally >20% by weight) even at room temperature, it is advisable to convert the reduced dye into a mixed alkali metal salt. Accordingly, the alkali used for more concentrated solutions is preferably a mixture of at least two alkali metal hydroxides wherein none of the alkali metal hydroxides accounts for more than 70 mol %.

Preferred alkali metal hydroxides are lithium hydroxide, sodium hydroxide and potassium hydroxide, which may all be present as a triple mixture or in the form of the respective double combinations, in which case mixtures of sodium hydroxide and potassium hydroxide are particularly preferred.

In mixtures of two alkali metal hydroxides, the molar ratio between the two is preferably in the range from 2:1 to 1:2, particularly preferably in the range from 1.5:1 to 1:1.5, most preferably about 1:1.

It is further advisable to minimize the electrolyte excess in order that any salting out of the dissolved leuco dye may be prevented.

The alkali, especially the alkali metal hydroxide mixture, is therefore generally used in amounts of from 1.2 to 2 mol, preferably of from 1.4 to 1.8 mol, in particular of around 1.5 mol, per mole of leuco dye.

The process of the invention is customarily carried out at from 10 to 80° C. Higher temperatures >40° C. increase not only the rate of reduction but also the solubility of the reduced dye. Thus the use of alkali metal hydroxide mixture and avoidance of an electrolyte excess will produce at about 40–60° C. from 50 to 55% strength by weight and at 60–80° C. from 55 to 60% strength by weight leuco indigo solutions devoid of any tendency to crystallize out.

The process of the invention may be carried out using the electrolysis cells disclosed in WO-A-90/15182, 95/07374 and 96/32445.

The process of the invention is useful for producing concentrated leuco salt solutions of all indigoid dyes, for example of indigo itself, mono-, di-, tri and tetrabromo- and/or -chloro-indigo and thioindigo and its derivatives.

The process of the invention is preferably used for producing from 15 to 45% strength by weight leuco dye solutions, in particular from 20 to 30% strength by weight leuco dye solutions, the corresponding leuco indigo solutions being of particular interest.

The leuco dye solutions obtained according to the invention are advantageously useful in indigo dyeing installations for all dyeing processes, for example yarn dyeing, exhaust dyeing, garment dyeing.

EXAMPLE

A 20% strength by weight solution of reduced indigo was prepared using the electrolysis cell described in WO-A-96/32445, which is divided by a Nafion® membrane and has an anode and a cathode cycle. The anode (200 mm×100 mm×3 mm, planar surface area 2 dm²) consisted of RA 1.457 (stainless steel). The cathode (identical dimensions) consisted of a carbon felt. An Ag/AgCl reference electrode was installed to be able to measure the cathode potential by means of a voltmeter. The potential was measured in solution via a Pt measuring electrode.

The following components were used to prepare 1 l of mediator solution:
53.6 g (0.33 mol) of iron(III) chloride
89 g (0.36 mol) of sodium heptagluconate
786 g (786 ml) of distilled water
53 g (35 ml) of 50% strength by weight sodium hydroxide solution
73 g (49 ml) of 50% strength by weight potassium hydroxide The following procedure was adopted: Iron(III) chloride and sodium heptagluconate were stirred into water. Sufficient alkali had been added during the dissolving of the salts for the pH of the solution to be maintained in the range from 3 to 5. On complete solution the remaining alkali was added a little at a time. The pH of the ready-prepared solution was 10.6.

The reduction was carried out by introducing into both the cathode space and the anode space of the electrolysis cell
924 ml of distilled water
50 ml of the mediator solution
90 ml of 50% strength by weight sodium hydroxide solution
126 ml of 50% strength by weight potassium hydroxide solution Additionally 4.3 g of indigo powder were introduced into the cathode space every 10 min for a period of 11 h 40 min at a constant electrolysis current of 6 A.

Following reduction of the indigo, the voltmeter indicated a potential of −850 mV.

1.5 kg were obtained of a 20% strength by weight aqueous leuco indigo solution having a density of 1.12 g/ml. The current yield was 88%.

We claim:

1. A process for preparing a from 5 to 60% by weight aqueous alkaline solution of a reduced indigoid dye, which comprises reducing said indigoid dye electrochemically in the presence of a mediator, where the dye to be reduced is not precharged all at once, but is added a little at a time.

2. A process as claimed in claim 1, wherein said mediator is an iron (II/III) complex salt.

3. The process as claimed in claim 2, wherein from 0.003 to 0.08 mol mole of dye.

4. The process as claimed in claim 3, wherein the alkali used is a mixture of at least two alkali metal hydroxides wherein none of the alkali metal hydroxides accounts for more than 70 mol %.

5. The process as claimed in claim 4 wherein from 1.2 to 2 mol of alkali are used per mole of dye and said reducing is effected at from 10 to 80° C.

6. The process as claimed in claim 5 wherein from 0.008 to 0.05 mol of mediator is used per mole of dye.

7. The process as claimed in claim 1, wherein from 0.003 to 0.08 mol of mediator is used per mole of dye.

8. The process as claimed in claim 1, wherein the alkali used is a mixture of at least two alkali metal hydroxides wherein none of the alkali metal hydroxides accounts for more than 70 mol %.

9. The process as claimed in claim 1, wherein from 1.2 to 2 mol of alkali are used per mole of dye.

10. The process as claimed in claim 1, wherein said reducing is effected at from 10 to 80° C.

11. The process as claimed in claim 1, wherein the solution prepared is a solution from 15 to 45% strength by weight leuco indigo solution.

\* \* \* \* \*

UNITED STATES PATENT AND TRADEMARK OFFICE
CERTIFICATE OF CORRECTION

PATENT NO. : 6,767,448 B1
DATED : July 27, 2004
INVENTOR(S) : Thomas Bechtold et al.

It is certified that error appears in the above-identified patent and that said Letters Patent is hereby corrected as shown below:

Column 4,
Line 43, after "mol" insert -- of mediator is used per --.

Signed and Sealed this

Thirtieth Day of November, 2004

JON W. DUDAS
*Director of the United States Patent and Trademark Office*